United States Patent
Hu et al.

(10) Patent No.: US 7,765,186 B1
(45) Date of Patent: Jul. 27, 2010

(54) UPDATE-ANYWHERE REPLICATION OF DISTRIBUTED SYSTEMS

(75) Inventors: Carl Hu, Arlington, MA (US); Frederick A. Tompkins, Jr., Londonderry, NH (US); Benjamin A. Rousseau, Somerville, MA (US)

(73) Assignee: Progress Software Corporation, Bedford, MA (US)

( * ) Notice: Subject to any disclaimer, the term of this patent is extended or adjusted under 35 U.S.C. 154(b) by 1104 days.

(21) Appl. No.: 11/292,055

(22) Filed: Nov. 30, 2005

Related U.S. Application Data

(60) Provisional application No. 60/671,373, filed on Apr. 13, 2005.

(51) Int. Cl.
*G06F 12/00* (2006.01)
*G06F 7/00* (2006.01)
*G06F 17/30* (2006.01)
(52) U.S. Cl. .................................. 707/612; 707/704
(58) Field of Classification Search ................. None
See application file for complete search history.

(56) References Cited

U.S. PATENT DOCUMENTS

| | | | |
|---|---|---|---|
| 5,699,500 | A | 12/1997 | Dasgupta |
| 6,052,695 | A | 4/2000 | Abe et al. |
| 6,154,847 | A | 11/2000 | Schofield et al. |
| 6,178,519 | B1 | 1/2001 | Tucker |
| 6,353,869 | B1 | 3/2002 | Ofer et al. |
| 6,493,726 | B1 | 12/2002 | Ganesh et al. |
| 6,574,654 | B1 | 6/2003 | Simmons et al. |
| 6,574,749 | B1 | 6/2003 | Parsons |
| 6,578,159 | B1 | 6/2003 | Kitagawa et al. |
| 6,665,814 | B2 | 12/2003 | Hobson et al. |
| 6,898,791 | B1 | 5/2005 | Chandy et al. |
| 7,146,366 | B2 | 12/2006 | Hinshaw et al. |

(Continued)

FOREIGN PATENT DOCUMENTS

EP    0682312 A2    11/1995

OTHER PUBLICATIONS

Agrawal, Divyakant et al., "Exploiting Atomic Broadcast in Replicated Databases," 1997, 8 pages [online] [Retrieved on Jan. 30, 2006] Retrieved from the Internet: <URL: http://citeseer.ist.psu.edu/cache/papers/cs/1240/http:zSzzSzwww.cs.ucsb.eduzSz~ioanazSzeuropar97.pdf/agrawal96exploiting.pdf>.

(Continued)

*Primary Examiner*—Charles Rones
*Assistant Examiner*—Alicia M Lewis
(74) *Attorney, Agent, or Firm*—Fenwick & West LLP

(57) ABSTRACT

Transactional database replication techniques are disclosed. The techniques can be realized in many ways, such as in a replicator module that can be instantiated at each site in a distributed system. The techniques support a variety of data storage technologies such as traditional durable transactional databases as well as in-memory data storage systems, and a variety of data types such as relational, flat file, XML, and object-oriented data. Guaranteed levels of distributed transactional data consistency for both reads and writes are enabled for database applications. The techniques also support the ability of applications distributed across a network to perform updates concurrently, and the ability to replicate many standard database systems without needing to modify their intrinsic behavior or needing them to be aware of the replicator, and the ability to tolerate network and process failures without any change to the data consistency guarantees provided to the applications.

34 Claims, 7 Drawing Sheets

U.S. PATENT DOCUMENTS

| | | | |
|---|---|---|---|
| 7,181,525 | B1 | 2/2007 | Hebel et al. |
| 7,356,531 | B1 | 4/2008 | Popelka et al. |
| 7,506,039 | B2 | 3/2009 | Hammons et al. |
| 2002/0129087 | A1* | 9/2002 | Cachin et al. ............... 709/200 |
| 2002/0194523 | A1 | 12/2002 | Ulrich et al. |
| 2003/0028819 | A1* | 2/2003 | Chiu et al. ..................... 714/5 |
| 2003/0204786 | A1 | 10/2003 | Dinker et al. |
| 2003/0220990 | A1 | 11/2003 | Narayanan et al. |
| 2004/0010544 | A1 | 1/2004 | Slater et al. |
| 2004/0030739 | A1 | 2/2004 | Yousefi'zadeh |
| 2004/0068563 | A1* | 4/2004 | Ahuja et al. ................. 709/225 |
| 2004/0128269 | A1* | 7/2004 | Milligan et al. ................ 707/1 |
| 2005/0021850 | A1* | 1/2005 | Minyard .................... 709/243 |
| 2005/0022047 | A1 | 1/2005 | Chandrasekaran |
| 2005/0033777 | A1* | 2/2005 | Moraes et al. ............. 707/202 |
| 2006/0090095 | A1* | 4/2006 | Massa et al. ................... 714/4 |
| 2006/0129872 | A1 | 6/2006 | Fung et al. |
| 2007/0028139 | A1* | 2/2007 | Wahl et al. ..................... 714/6 |
| 2008/0256299 | A1* | 10/2008 | Iyengar et al. ............. 711/124 |

OTHER PUBLICATIONS

Amir, Yair et al., "From Total Order to Database Replication, Technical Report CNDS-2001-6," Nov. 5, 2001, 26 pages [online] [Retrieved on Jan. 30, 2006] Retrieved from the Internet: <URL: http://www.cnds.jhu.edu/pub/papers/cnds-2001-6.pdf>.

Gray, Jim et al., "The Dangers of Replication and a Solution," 1996, pp. 173-182 [online] [Retrieved on Jan. 30, 2006] Retrieved from the Internet: <URL: http://www-2.cs.cmu.edu/~natassa/courses/15-823/F02/papers/ gray96danger.pdf>.

Moser, L.E. et al., "Extended Virtual Synchrony," 1994, 10 pages [online] [Retrieved on Jan. 30, 2006] Retrieved from the Internet: <URL: http:// www.cs.jhu.edu/~yairamir/dcs-94.ps>.

Schneider, Fred B., et al., "Implementing Fault-Tolerant Services Using the State Machine Approach: A Tutorial," ACM Computing Surveys, Dec. 1990, vol. 22, No. 4, pp. 299-319 [online] [Retrieved on Jan. 30, 2006] Retrieved from the Internet: <URL:http://www.cs.cornell.edu/fbs/publications/SMSurvey.pdf>.

Stanoi, I. et al., "Using Broadcast Primitives in Replicated Databases," Proceedings of ICDCS '98, May 1998, Amsterdam, The Netherlands, 8 pages [online] [Retrieved on Jan. 30, 2006] Retrieved from the Internet: <URL: http://www.cs.ucsb.edu/~dsl/publications/1998/stanoi_icdcs.pdf>.

Vitenberg, Roman et al., "Group Communication Specifications: A Comprehensive Study," Sep. 17, 1999, 50 pages [online] [Retrieved on Jan. 30, 2006] Retrieved from the Internet: <URL: http://theory.lcs.mitedu/~idish/ftp/gcs-survey-tr.pdf>.

Kemme, B., "Database Replication for Clusters of Workstations," Dissertation, Swiss Federal Institute of Technology Zurich, 2000 [Retrieved on Jul. 9, 2007] Retrieved from the Internet<URL:http://www.cs.mcgill.ca/~kemme/papers/phd-dina4.pdf>.

International Search Report and Written Opinion, PCT/US06/14064, Sep. 26, 2007, 9 pages.

Chinese Office Action, Chinese Application No. 200680018705.X, Nov. 20, 2009, 10 pages.

Extended European Search Report, European Application No. 06750173.4, Dec. 3, 2009, 5 pages.

United States Office Action, U.S. Appl. No. 11/404,155, Oct. 28, 2009, 21 pages.

\* cited by examiner

UPDATE-ANYWHERE REPLICATION OF DISTRIBUTED SYSTEMS

RELATED APPLICATIONS

This application claims the benefit of U.S. Provisional Application No. 60/671,373, filed on Apr. 13, 2005. In addition, this application is related to U.S. application Ser. No. 11/270,196, filed Nov. 8, 2005, and titled "Fault Tolerant Distributed Lock Management." Each of these applications is herein incorporated in its entirety by reference.

FIELD OF THE INVENTION

The invention relates to distributed systems, and more particularly, to transactional database replication.

BACKGROUND OF THE INVENTION

Modern computer systems typically include a CPU to process data, a networking interface to communicate with other computer systems, and one or more durable storage units. The system may stop processing, for example, due to power failure, program incorrectness, or a hardware fault. Such failures are often called process failures. The durable storage units are able to keep the data intact while the fault is repaired.

A set of these computer systems can be networked to form a cluster. Although the network is generally reliable, occasional faults may occur to disrupt communication between certain nodes or sets of nodes. This disruption in communication is often called a network partition.

Each of these nodes runs a transactional storage system that both reads and writes data (a database management system). Some of this data is concurrently accessed by applications operating on different nodes. To guarantee data consistency, database replication techniques are used to manage and regulate access to that data. However, such conventional replication techniques are associated with a number of tradeoffs and problems.

For example, in traditional replication systems, there is a tradeoff between data consistency and fault tolerance. In more detail, replication systems that provide high data consistency tend to exhibit low fault tolerance. Likewise, replication systems that provide high fault tolerance tend to exhibit low data consistency. In addition, theoretical transactional fault tolerant replication systems require significant changes to existing database management systems.

What is needed, therefore, are database replication techniques that provide high data consistency and fault tolerance, and that have the flexibility to be applied to both existing and new database systems, existing and new applications, and configurability to achieve various data consistency levels with different performance and fault tolerance characteristics.

SUMMARY OF THE INVENTION

One embodiment of the present invention provides a method for replicating data among a plurality of processing sites each communicatively coupled to a network. The method includes acquiring one or more distributed exclusive locks associated with a write transaction, sending data changes caused by the write transaction to other processing sites after the write transaction is committed, and guaranteeing that release of the one or more distributed exclusive locks always occurs after data changes caused by the write transaction are sent to the other processing sites. The method may include coordinating operation of replication components to implement read, write, commit, and reconciliation rules. The method may include receiving data changes, and updating data in a storage with those data changes. The method may include retrieving committed changes from a storage so that those data changes can be sent to the other members. The method may include multiplexing outputs into an extended virtual synchrony (EVS) transport. The method may include acquiring a distributed share lock associated with a read transaction, and acquiring a local read lock associated with the read transaction. The method may include acquiring a local write lock associated with the write transaction. The method may include capturing the data changes in a database change log. In one such case, after successfully committing the data changes, the method further includes retrieving all data changes associated with the write transaction from the database change log to form a change set that preserves change ordering, and assigning an identifier to the change set, the identifier specifying a site that initiated the commit. The retrieving and assigning can be achieved, for example, using an external process, woken by a database commit. The method or external process may include passing the change set to a total persisted order state machine (TPOSM), the TPOSM using an extended virtual synchrony (EVS) broadcast primitive. In one particular case, after successful commit of a transaction, all distributed share locks and distributed exclusive locks associated with the transaction are released. Sending data changes caused by the write transaction to other processing sites after the write transaction is committed can be achieved, for example, using a total order broadcast primitive. In response to other processing sites requesting the distributed lock, the method may include broadcasting messages to the other processing sites using a total order broadcast primitive in order to transfer ownership of the distributed lock. In another particular case, a total persisted order system delivers change sets and a total order broadcast primitive delivers lock management messages, where the method further includes reconciling at least one of received change sets and lock management messages, so that the change sets are applied and lock releases processed in proper order. In one such case, the reconciling is achieved using an external process that receives the delivered messages from a total order broadcast primitive. The may include the preliminary steps of requesting one or more distributed exclusive locks associated with the write transaction for locally stored data, receiving data changes caused by another write transaction performed at another processing site on a replica of the locally stored data, the received data changes indicating differences between the locally stored data and the replica, and guaranteeing that all the received data changes are applied to the locally stored data before any of the distributed exclusive locks associated with the write transaction are granted.

Another embodiment of the present invention provides a machine-readable medium (e.g., compact disk, diskette, server, memory stick, or hard drive) encoded with instructions, that when executed by a processor, cause the processor to carry out a process for replicating data among a plurality of processing sites each communicatively coupled to a network. This process can be, for example, similar to or a variation of the previously described method.

Another embodiment of the present invention provides a replicator (e.g., system, apparatus, device, module, etc) for replicating data among a plurality of processing sites each communicatively coupled to a network. The replicator includes a fault tolerant distributed lock manager (FTDLM) for acquiring one or more distributed exclusive locks associated with a write transaction, and guaranteeing that release of the one or more distributed exclusive locks always occurs after data changes caused by the write transaction are sent to the other processing sites. The replicator also includes a total persisted order state machine (TPOSM) for sending data changes caused by the write transaction to other processing sites after the write transaction is committed. The replicator may include a replication coordination state machine (RCSM) for coordinating operation of replicator components including the TPOSM and the FTDLM to implement read, write, commit, and reconciliation rules. The replicator may include a reconciler module for receiving data changes, and updating data in a storage (e.g., database or file system) with those data changes. The replicator may include a change capture retriever (CCR) module for retrieving committed data changes from a storage so that those data changes can be sent by the TPOSM. The replicator may include a router for multiplexing outputs from the FTDLM and the TPOSM into an extended virtual synchrony (EVS) transport.

The replicator functionality can be implemented, for example, in software (e.g., executable instructions encoded on one or more computer-readable mediums), hardware (e.g., gate level logic), firmware (e.g., one or more microcontrollers with embedded routines), or some combination thereof, or other suitable means. Various combination of structure and functionality will be apparent in light of this disclosure. For example, another embodiment provides a system for replicating data among a plurality of processing sites each communicatively coupled to a network. In this particular example embodiment, the system includes: a means for requesting one or more distributed exclusive locks associated with a write transaction A for locally stored data; a means for receiving data changes caused by a write transaction B performed at another processing site on a replica of the locally stored data, the received data changes indicating differences between the locally stored data and the replica; a means for guaranteeing that all the received data changes are applied to the locally stored data before any of the one or more distributed exclusive locks associated with the write transaction A are granted; a means for acquiring the one or more distributed exclusive locks associated with the write transaction A; a means for sending data changes caused by the write transaction A to other processing sites after the write transaction A is committed; and a means for guaranteeing that release of the one or more distributed exclusive locks always occurs after data changes caused by the write transaction A are sent to the other processing sites. Note that other embodiments may include a subset of this functionality, such as: a means for requesting one or more distributed exclusive locks associated with a write transaction A for locally stored data; a means for receiving data changes caused by a write transaction B performed at another processing site on a replica of the locally stored data, the received data changes indicating differences between the locally stored data and the replica; a means for guaranteeing that all the received data changes are applied to the locally stored data before any of the one or more distributed exclusive locks associated with the write transaction A are granted. Numerous embodiments will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
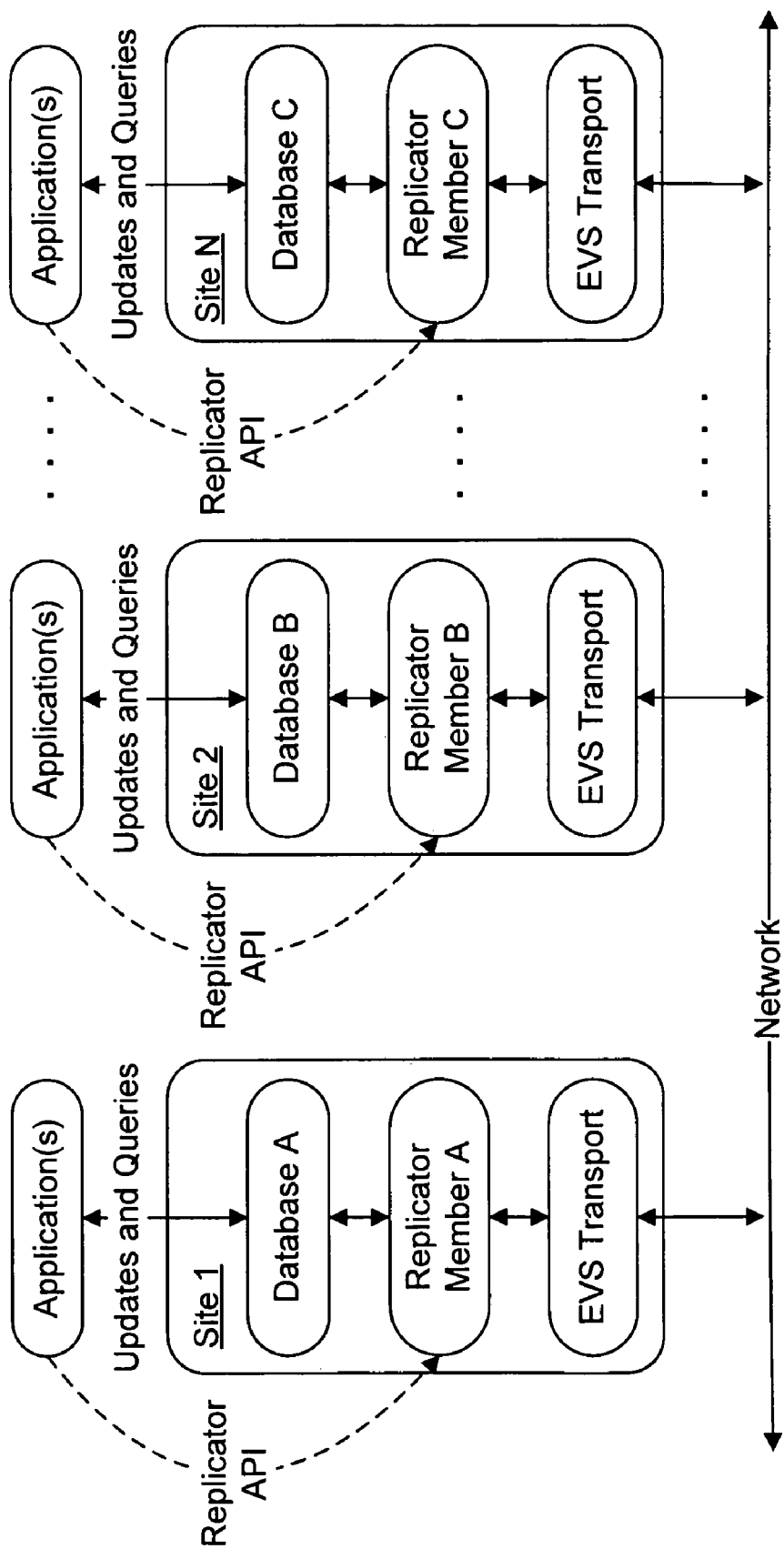
FIG. 1 is a block diagram of a system for replicating autonomous databases distributed across a network, configured in accordance with an embodiment of the present invention.

Database replication techniques are disclosed that provide high data consistency and fault tolerance. The techniques have the flexibility to be applied to both existing and new database systems, existing and new applications (e.g., techniques can be implemented so that altering database management system implementation is not necessary, but can also be used in conjunction with alterations to a particular database management system implementation, if so desired). The techniques also provide configurability to achieve various data consistency levels with different performance and fault tolerance characteristics.

General Overview

Each of the "sites" in a network of computer systems can run a transactional storage system (also called a database management system). In one embodiment of the present invention, the data in each of these storage systems is replicated to some or all of the others. There can be several applications concurrently updating and reading the data at a particular site. Also, the sites can operate autonomously and be concurrently updated with respect to each other. Updates made at one site can be transferred to the other sites. To each application or application instance, the replica of the database appears as if it were the only database in the system. Effective transactional database replication is provided.

One such embodiment integrates a fault tolerant lock manager (such as the one described in the previously incorporated U.S. application Ser. No. 11/270,196) with a persistent total order algorithm to build a transactional replication system that does not require the modification of the databases. In one particular case, the manner of this integration involves an organization of functions including database transaction commit, transaction commitment notification to the replication system, capture and recording of changes made to the data stored in the database, retrieving the changes from the database, sending the changes to the other replicas of the system, and transferring associated locks to others as needed. The set of sites containing the various replicas is termed a "coordination group."

In addition, a system resulting from this integration is a general replication system capable of operating with "off the shelf" database management systems, with performance and reliability characteristics superior to earlier designs. This embodiment of the invention is suitable, for example, for applications such as highly available clusters, update-anywhere data caching, as well as heterogeneous database replication. The database management systems employed in a single coordination group may utilize the relational model, or other data models such as those provided by object databases, simultaneously.

The replication techniques discussed herein are fundamentally method-based. There are many ways to realize these techniques in an implemented system. In one particular implementation, the majority of the functional logic is encapsulated in a module referred to herein as a replicator. For ease of exposition, the module is specified in detail based on its inputs, outputs, and logic implemented within the replicator. Numerous implementations and configurations will be apparent in light of this disclosure, and the present invention is not intended to be limited to any one particular such embodiment.

Thus, techniques described herein can be used, for instance, to replicate database management systems distributed across and connected by a message passing network. The techniques described herein support a variety of data storage technologies such as traditional durable transactional databases as well as in-memory data storage systems, and a variety of data types such as relational, flat file, XML, and object-oriented data. The techniques described herein also provide database applications guaranteed levels of distributed transactional data consistency (e.g., serializable) for both reads and writes. The techniques also support the ability of applications distributed across a network to perform updates concurrently, and the ability to replicate many standard database systems without needing to modify their intrinsic behavior or needing them to be aware of the replicator, and the ability to tolerate network and process failures without any change to the data consistency guarantees provided to the applications. In short, fault tolerant, update-anywhere, transactional replication of autonomous databases distributed across and connected by a message-passing network is enabled. Other applications that can benefit from the techniques described herein will be apparent in light of this disclosure.

In more detail, consider an example system that includes a set of sites (e.g., nodes, servers, etc) S={Site 1, Site 2, ..., Site N}, each site including a copy of the entire database. Assume that the set S is fixed and is known to each of the sites in S. Further assume that each of the sites have identical data. Subsequently, as updates are executed on a site in S, the replication techniques described herein ensure continued data consistency of S. The sites communicate by exchanging messages over a communications network. During operation, messages may be lost, sites may crash, and network partitions may occur. A site that crashes may subsequently recover retaining its old identifier and stable storage.

In this example system, each site executes several processes, including a database server, a replication service, and a reliable broadcast primitive. Other processes may also be executed at each site. The crash of any of the components running on a node will be detected by the other components and treated as a site crash. In addition, the network may partition into a finite number of disconnected components. Sites situated in different components cannot exchange messages (by definition), while those situated in the same component can continue communicating. Two or more components may subsequently merge to form a larger component.

The reliable broadcast primitive (e.g., extended virtual synchronous transport) is used in this example system to provide reliable multicast messaging with total ordering guarantees. The primitive provides configuration notification services, informing the replication service about sites that can be reached from the current component. The notification occurs each time a connectivity change or a site crash or recovery occurs. The set of participants that can be reached by a server at a given moment is called a configuration (sometimes referred to as a view). The replication service handles the site crashes and network partitions using these notifications. The basic property provided by the primitive in this example embodiment is known as virtual synchrony and it guarantees that sites that move together from one view to another deliver the same ordered set of messages in the former view.

One way to understand replication methods is to look at the requirements they impose on the overall system during the various operations of a transaction: beginning a transaction, reading, writing, and committing. For convenience, the requirements associated with reading are generally referred to herein as the Read Rule. Likewise, requirements associated with writing, are generally referred to herein as the Write Rule. Likewise, requirements associated with committing, are generally referred to herein as the Commit Rule. One limitation to some previous approaches of fault tolerant transactional replication is the rigidity of these requirements. For example, some of these requirements are difficult to incorporate into existing systems or applications.

One such system of rules can be viewed as follows: (1) Read Rule: A read operation $ri[x]$ of a transaction $Ti$ is executed locally by acquiring a read lock at the initiating site of transaction $Ti$. $Ti$ remains blocked until the read lock of x is granted at the initiator; (2) Write Rule: A write operation $wi[x]$ of a transaction $Ti$ is executed by broadcasting it to all sites. A delivery, a site S acquires a local write lock on x for $Ti$. If it is currently held by another transaction, then $wi[x]$ is delayed until the local write lock on x is granted. (3) Commit Rule: When an initiating site I decides to commit a transaction $Ti$, it reliably broadcasts a commit request $ci$ to all sites including itself. In delivery of $ci$ (which is in the total order), each site S (including I) checks if $Ti$ has any pending write operations. If so, S broadcasts a negative acknowledgement to all sites. Otherwise, a positive acknowledgement is broadcast. A transaction is aborted at all sites including the initiator of $Ti$ if there are any negative acknowledgements of $Ti$'s commit request. On the other hand, if all sites acknowledge positively, $Ti$ is committed (essentially a decentralized 2-phase commit protocol).

While the Read Rule is satisfied by many modern DBMS implementations, the Write and Commit Rules, are not. Furthermore, it is often not possible to modify existing DBMS implementations to satisfy these requirements. For example, most DBMS implementations acquire write locks in the order that locally executing transactions request updates. DBMS implementation do not, as the conventional Write Rule requires, delay the acquisition of write locks until receiving the delivery of writes from a total ordering transport. This delayed lock acquisition is a fundamental property of typical total order broadcast based replication algorithms, such as those described in: "Using Broadcast Primitives in Replicated Databases," by Stanoi, Agrawal, and Abbadi (1998 ICDCS proceedings), and "Exploiting Atomic Broadcast in Replicated Databases," by Pedone, Guerraoui, and Schiper (1998 EuroPar), and, "From Total Order to Database Replication," by Yair Amir and Ciprian Tutu (2002 ICDCS proceedings). It is this behavior that allows these conventional algorithms to guarantee that all sites execute the same updates in the same order, thereby satisfying the requirements described in: "Implementing Fault-Tolerant Services Using the State Machine Approach," by Schneider (1990 ACM Computing Surveys). Each of these four published papers is herein incorporated in its entirety by reference (the first three are also included in Appendix B of the previously incorporated U.S. Provisional Application No. 60/671,373).

One embodiment of the present invention modifies the conventional Write Rules to allow the replication techniques described herein to be used with a broader range of DBMS implementations, without the need to alter the DBMS (although other embodiments can be used in conjunction with alterations to a particular database management system implementation, as will be apparent in light of this disclosure). One particular such embodiment adopts the state machine approach to database replication when concurrent updates do not overlap, but falls back on pessimistic concurrency control when they do overlap.

Most DBMS implementations also commit transactions directly when a locally executing transaction requests a commit. They do not, as the various conventional Commit Rules previously described, delay the local commit until receiving the delivery of various messages from the total ordering transport. One embodiment of the present invention modifies these conventional Commit Rules as well. In addition, a Reconciliation rule is added to the three Read, Write, and Commit Rules (as modified herein) to address requirements when a message is received at a site. Each rule will now be discussed in turn.

Read Rule

The Read Rule is as follows: A read operation $r_i[x]$ of a transaction $T_i$ is executed locally by acquiring a local read lock at the initiating site of transaction $T_i$. $T_i$ remains blocked until the local read lock of x is granted. This rule is identical to the previously described conventional rule, and is satisfied by many DBMS implementations. Strict one-copy serializable replicated database consistency can be, achieved with this rule. Weaker levels of consistency can also be achieved with corresponding improvements in throughput and deadlock rate.

A variant of this Read Rule provides a decrease in deadlock rate gained at the expense of increased distributed lock traffic. Such a tradeoff is attractive to some applications. The variant includes two parts, and is as follows: (Part one) A read operation $r_i[x]$ of a transaction $T_i$ at site I is executed locally by acquiring a distributed share lock for x. $T_i$ remains blocked until the distributed share lock of x is granted to site I. (Part two) When the distributed share lock is acquired, $T_i$ must then acquire a local read lock at site I. $T_i$ remains blocked until the read lock of x is granted at site I. Part one of this alternate Read Rule is not immediately satisfied by DBMS implementations. Satisfaction of this variant may nevertheless be achieved for these implementations by these two examples: (a) exploiting available customization facilities exposed by DBMS implementations so that it causes the acquisition of the distributed share lock before reading data, or (b) by writing or instrumenting the applications to cause the acquisition of the distributed share lock before reading data.

An embodiment of the present invention can be programmed or otherwise configured to use either the traditional Read Rule or the variant described herein (or both).

Write Rule

The Write Rule includes three parts, which are as follows: (Part one) A write operation $w_i[x]$ of a transaction $T_i$ on initiating site I is executed by first acquiring a distributed exclusive lock for x. If the lock is currently owned by another site, then $w_i[x]$ is delayed until ownership of the distributed exclusive lock for x is granted to site I. (Part two) When the distributed exclusive lock for x is successfully acquired, the local write lock for x must be acquired. If this local write lock is currently held by another transaction, then $w_i[x]$ is delayed until this local lock is granted. (Part three) The write is then performed and the change is captured in a change log.

Part one of this Write Rule is not immediately satisfied by some DBMS implementations. Satisfaction of this requirement may nevertheless be achieved for these implementations in a number of ways. Here are two examples: (1) instrumenting or writing the application(s) so that it causes the acquisition of the distributed exclusive lock before writing, and (2) incorporating a lock detector associated with the database using available customization facilities exposed by DBMS implementations. This lock detector can then acquire the distributed exclusive lock before the DBMS performs the write. The management of this distributed exclusive lock can be implemented in various ways. In one particular embodiment, this management is implemented via the incorporation of a fault tolerant distributed lock manager (FTDLM) as will be discussed in turn, with reference to the replicator module.

Part two of this Write Rule is immediately satisfied by many DBMS implementations. Part three of this Write Rule requires that a persistent record of $w_i[x]$, $L[w_i[x]]$ is atomically recorded, in order, along with $w_i[x]$ in such a way that $L[w_i[x]]$ is available for later read access as described with reference to the Commit Rule. This can be satisfied in a variety of ways by many DBMS implementations. Here are two implementation examples: (1) Many standard DBMS implementations (e.g., Oracle and SQL server) use a log to maintain durability and record $L[w_i[x]]$ with the required atomicity. In particular, as transactions make updates, typical DBMS implementations record all the updates in the log (i.e., they use the log to ensure fault tolerance from process failure, and replay the log as necessary on restart). One embodiment of the present invention accesses this log (as described with reference to the Commit Rule) to satisfy this requirement. In more detail, in addition to using the log for fault tolerance, the log is used to satisfy the change capture requirement of the replication techniques described herein. After the commit, a change capture retriever module can access changes from this log. (2) The available customization facilities provided by the DBMS implementation can be used to capture each $w_i[x]$ into a transactionally persistent data structure for subsequent access. In more detail, all databases offer "triggers," user-definable procedures that are run when transactions do updates. If the triggers are written in such a way that, say an update to a row results in an insert into the "change capture table", then part three of the Write Rule is satisfied. These two implementation examples are herein called "change capture mechanisms," and the data structure that includes the captured changes the "change log."

Commit Rule

The Commit Rule includes three parts, which are as follows: (Part one) When an initiating site I decides to commit a transaction Ti, the database transaction is immediately committed. (Part two) After the commit succeeds, a transaction tk is begun and executes the following three tasks: (a) All changes associated with transaction Ti are retrieved from the change log to form a change set. The change set preserves change ordering. This process is herein called "change retrieval." (b) Once the change set is formed, the change set is decorated with an identifier specifying the initiating site I. This decorated change set is then given to a total persisted order system, which in turn uses a total order broadcast primitive to eventually deliver the change set to all sites, including I. (c) The change log is modified in such a way as to guarantee that changes that have been retrieved are not retrieved again. (Part three) Upon the successful commit of tk, which atomically commits parts 2a through 2c, all distributed share or exclusive locks associated with Ti are released. If necessary, a message to transfer the ownership of locks is constructed and broadcasted using the total order broadcast primitive to guarantee delivery order.

Part one of this Commit Rule is immediately satisfied by most DBMS implementations. Part two of this Commit Rule is not immediately satisfied by most DBMS implementations. In one particular embodiment, this is achieved by having an external process, woken by a database commit. One example such external process is as follows: (1) begin a transaction and query the database to retrieve the changes from the change log; (2) form a change set and set the initiator identifier for the change set and pass it to a total persisted order state machine (TPOSM), such as the one described in the previously incorporated "From Total Order to Database Replication," by Yair Amir and Ciprian Tutu, with the TPOSM using an extended virtual synchrony (EVS) broadcast primitive; (3) the messages in the change log that were retrieved are "marked red" in the parlance of Amir and Tutu, effectively deleted from the change log and inserted into the "action queue."

Part three this Commit Rule involves the release of the distributed locks acquired in the course of executing transaction Ti. In one particular embodiment, this is achieved by informing the FTDLM that the transaction has committed via the TransactionCompleted notification. The FTDLM may, if there are other sites requesting the distributed lock, broadcast messages to other sites using the total order broadcast primitive in order to transfer ownership of the distributed lock. This also guarantees that the lock transfer is delivered to all sites after the change set is delivered, for maintaining data consistency.

Reconciliation Rule

The Reconciliation Rule includes four parts, which are as follows: (Part one) At each site, the total persisted order system delivers change sets and the total order broadcast primitive delivers lock management messages. (Part two) If the delivered message to site R is a change set, then site R extracts from the change set the initiator site I. If I is different from R, R applies each change in the change set to the database in order. This process is herein called "reconciliation." If R is the same as I, then the changes have already been applied and reconciliation is not necessary. (Part three) If the delivered message to site R is a lock ownership transfer, then this message is processed by the lock management system. (Part four) Change sets and lock transfers are processed in the order that they are delivered.

Augmenting typical DBMS implementations with this logic poses few problems. For example, a TPOSM can be used as the persistent total ordering mechanism and the FTDLM as a lock manager. The TPOSM and the FTDLM can both be configured to use the same broadcast primitive for communication with other sites. This ensures that the ordering between lock management and change set delivery is preserved (Part 4 of this Reconciliation Rule). These elements can be incorporated in an external process that receives the delivered messages from the broadcast primitive. In addition, logic can be used to reconcile the received change sets to the database by using available database query mechanisms.

System Architecture

FIG. 1 is a block diagram of a system for replicating autonomous databases distributed across a network, configured in accordance with one embodiment of the present invention.

As can be seen, the system includes a number. (N) of sites (or node) each communicatively coupled to a network via an extended virtual synchrony (EVS) transport module. Each site includes one or more applications that can access the local database of that site (e.g., database A of site 1, database B of site 2, and database C of site N). In addition, applications from one particular site can access the databases of other nodes. Thus, the resources stored in any one database can be concurrently accessed by applications operating on different sites. The applications at each site can be executed, for example, by a processing system (not shown) such as a server, work station, laptop, or personal digital assistant, or any kind of computing system.

A replicator module local to each database is programmed or otherwise configured to replicate the set of databases with each other. Each instance of the replicator module executes identical logic, as will be described herein. Note, however, that correct operation of the logic requires certain configuration information unique to each instance. In particular, each replicator module instance is configured to be associated with its own database instance as well as its own unique identifier. A particular instance of the replicator module configured in this manner is termed a member (e.g., replicator member A, B, and C).

Recall that a set of sites including the database replicas is referred to herein as a coordination group. Any member belongs to a coordination group. The replicator module replicates the data in the databases of all members that are in the same coordination group.

In addition to the associated unique identifier and database, each instance of the replicator module is configured to locally store a persistent membership list including the unique identifiers of all of the members of the coordination group. The contents of the membership lists associated with each member belonging to the same coordination group are identical. This membership list can be initially distributed and agreed upon using any number of suitable mechanisms, such as an automatic messaging and compilation scheme where one or more sites are programmed or otherwise configured to send messages out to the network requesting all recipients to reply back with their member ID (various compiled lists can then be correlated by a master site to provide an agreed upon list that is then distributed to all sites), or a manual process where an administrator compiles and distributes the membership list.

Each database may have multiple applications that concurrently query and update the data stored in the database. Note that in this example configuration, an application notifies the replicator module via a replicator API of transaction begins, commits, and lock requests. However, this direct communication from the application to the replicator module is not necessary to the design of the replicator module. For instance, in an alternative embodiment, the database can be configured or modified to directly inform the replicator module of these notifications. In another embodiment, the database driver or provider (e.g., JDBC, .Net, ODBC, or other middleware) can be programmed or otherwise configured to intercept operations (e.g., begin, update, commit) from an application. In such a configuration, the driver/provider can be further configured to inform the replicator module of necessary notifications. Another embodiment is to leverage standard database customization facilities like stored procedures and triggers to provide the replicator module with necessary notifications. For example, update triggers can be used to provide the replicator module with an OnLock event.

If a coordination group contains more than one member, the members communicate to each other via the communications network (e.g., TCP/IP, NFS, Ethernet, etc), as shown in FIG. 1. The network may intermittently fail, partitioning the members into a variety of configurations. For example, the initial configuration {A,B,C} may be partitioned into two configurations: {A,B} and {C}. In this use of the replicator module, the three applications may concurrently query and update their respective databases, as shown in FIG. 1. The replicator module distributes these changes and updates of data from the applications such that there is no semantic difference from the applications point of view in terms of data consistency in this system as compared to a system with a single database that is receiving concurrent queries and updates from multiple applications.

This equivalence in data consistency from the perspective of the applications is what is meant by transactional replication. Although there is equivalence in data consistency, there are significant advantages in terms of performance and availability in the embodiment depicted in FIG. 1 over a system configuration with a single database that is receiving concurrent queries and updates from multiple applications. Furthermore, when applications can operate correctly with less than full serializable isolation (e.g., read-committed); the replicator module instances in FIG. 1 can be configured to achieve still higher system throughput and fault tolerance.

Each application within any node has access to its local database, as well as access to the databases of other nodes. In general, an application is any program or system that can read, add, delete, modify, update, or otherwise manipulate data stored in one or more of the databases included in the distributed system. The applications can be, for example, user activated (e.g., banking or accounting software), or automatically activated by a system (e.g., inventory control software programmed to run automatically on a daily basis).

The database of each node stores the resources that are used by one or more of the applications. As is known, a database is a collection of structured data. Clients can access the data by submitting transactions, consisting of a set of commands that follow the ACID properties (atomicity, consistency, isolation, and durability). Each site from the server set maintains a private copy of the database. The initial state of the database is identical at all servers. A change set defines a transition from the current state of the database to the next state. The organization of the databases can be the same (e.g., all relational databases) or different (e.g., some relational databases and some object oriented databases). Any type or combination of data storage facilities can be used, with heterogeneous or homogenous data.

The EVS transport module imposes an ordering on all data items in the global model, and can be implemented using conventional total order techniques. In one particular embodiment, the EVS transport module is implemented as described in "From Total Order to Database Replication", by Yair Amir and Ciprian Tutu. Likewise, the EVS transport module can be implemented as described in "Extended Virtual Synchrony", L. E. Moser, Y. Amir, P. M. Melliar-Smith, and D. A. Agarwal, University of California at Santa Barbara, Department of Electrical and Computer Engineering. Note that these papers are available online, and are also included in Appendix B of the previously incorporated U.S. Provisional Application No. 60/671,373. Further note that an Extended Virtual Synchrony Transport is one specific implementation of a total order transport module, and the other embodiments of the present invention can be implemented with total order transport techniques other than extended virtual synchrony transports.

Although each of the replicator module, application(s), and database of each site are shown as distinct components in this example embodiment, other configurations can be used as well. For example, any one or all of these components can be programmed or otherwise integrated into the other (e.g., the replicator module and EVS transport can be integrated into the database). Conventional or custom networking and/or inter-process protocols and techniques can be used to carry-out communication between the components in any one site, as well as between sites. In addition, wired and/or wireless technology can be employed for intra-site and inter-site communication. For convenience of illustration, each of the database, replicator module, and EVS transport are depicted as residing on the same machine. In other embodiments, each module or component can execute on a separate machine, if so desired.

Replicator Module

Figure 2A:
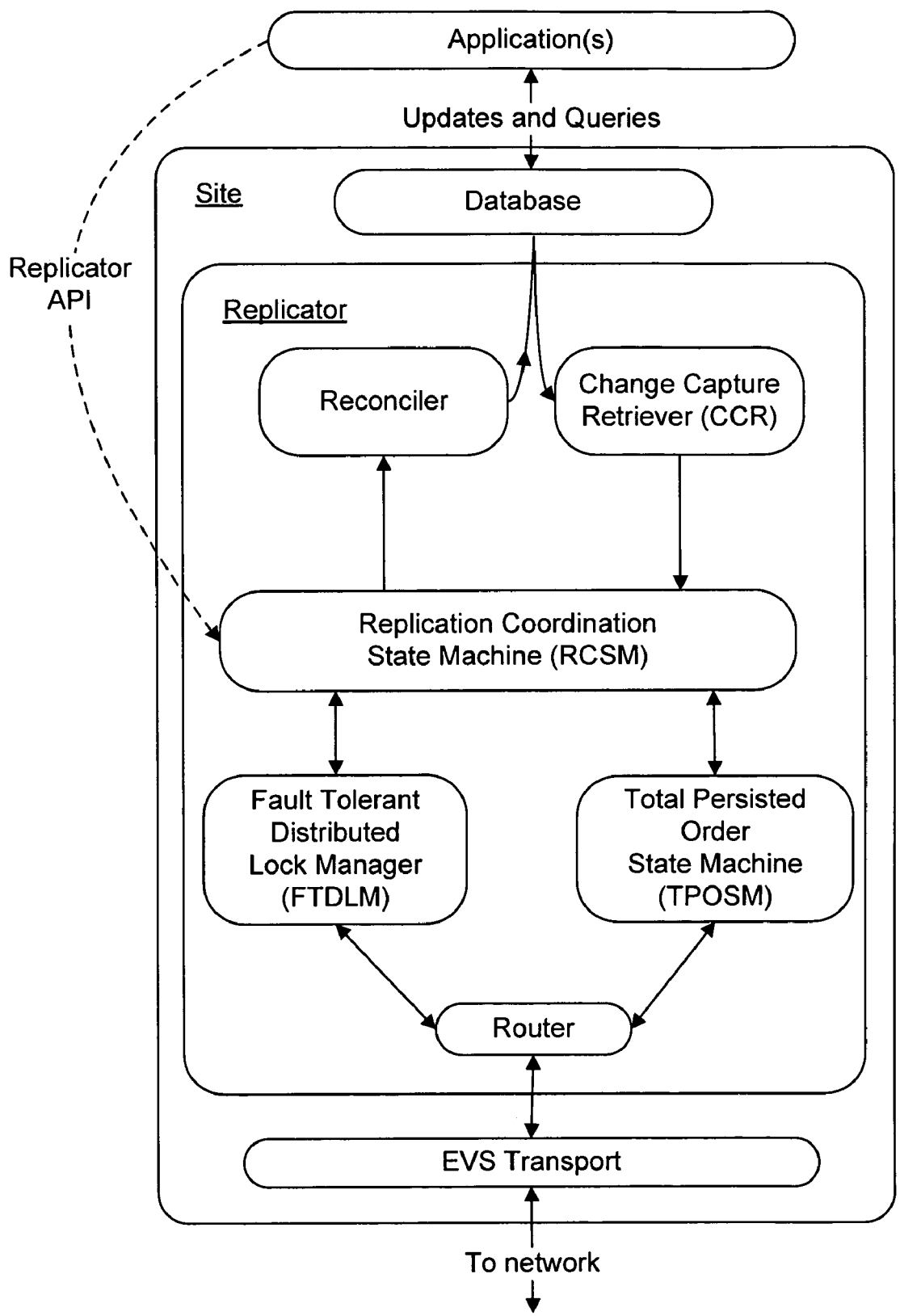
FIG. 2a is a block diagram of a replicator module shown in FIG. 1, configured in accordance with an embodiment of the present invention.

FIG. 2a is a block diagram of a replicator module shown in FIG. 1, configured in accordance with an embodiment of the present invention: As previously explained, the replicator module is communicatively coupled between the database and the EVS transport (or other suitable total order transport module). Within the replicator module are shown modules required to implement the functionality described herein. In particular, this embodiment includes a reconciler module, a change capture retriever module, a replication coordination state machine, a fault tolerant distributed lock manager module, a total persisted order module, and a router. Arrows represent the direction of data flow between the modules.

The reconciler module takes as input change sets from the replication coordination state machine (RCSM) and updates the data in the database with these changes. The reconciler module abstractS away differences in database structure, schema, and query language from the other components in the replicator.

The change capture retriever (CCR) module is used by the RCSM to retrieve committed changes from the database. The CCR module returns change sets to the RCSM. The CCR module abstracts away differences in database structure, schema, and query language from the other components in the replicator.

The total persisted order state machine (TPOSM) is used by the RCSM to send change sets retrieved from the CCR to the other members of the coordination group. The TPOSM also delivers change sets to the RCSM, whereupon the RCSM will reconcile, if required, the change set using the reconciler module. The TPOSM uses the EVS transport.

The fault tolerant distributed lock manager (FTDLM) takes as input notifications of write locks, transaction begins, and transaction commits. Here, notifications are directly from the applications. In other embodiments, these notifications can come from a detector so that the applications need not call the FTDLM directly. The FTDLM acquires and releases distributed locks. The FTDLM uses the same EVS transport as the TPOSM and sends messages in the same total order stream as the TPOSM.

The replication coordinator state machine (RCSM) coordinates the operation of the CCR module, TPOSM, reconciler module, and FTDLM to implement the Read, Write, Commit, and Reconciliation Rules of the replication techniques as described herein.

With regard to the router module, both the FTDLM and the TPOSM use the same EVS transport (and the same total order group) to send and receive messages. The router module is used to multiplex input and outputs from the two components into the same EVS transport.

In one such embodiment, the replicator module is implemented with software (e.g., one or more set of instructions executing on one or more processors or encoded on one or more processor readable mediums). Alternatively, the replicator module can be implemented, for example, in hardware (e.g., gate-level logic) or a combination of hardware and software (e.g., microcontroller with a number of embedded routines for carrying out the functionality described herein). In addition, note that functionality of one module may be integrated into one or more other modules in various alternative embodiments.

Replicator Data Flow

Figure 2B:
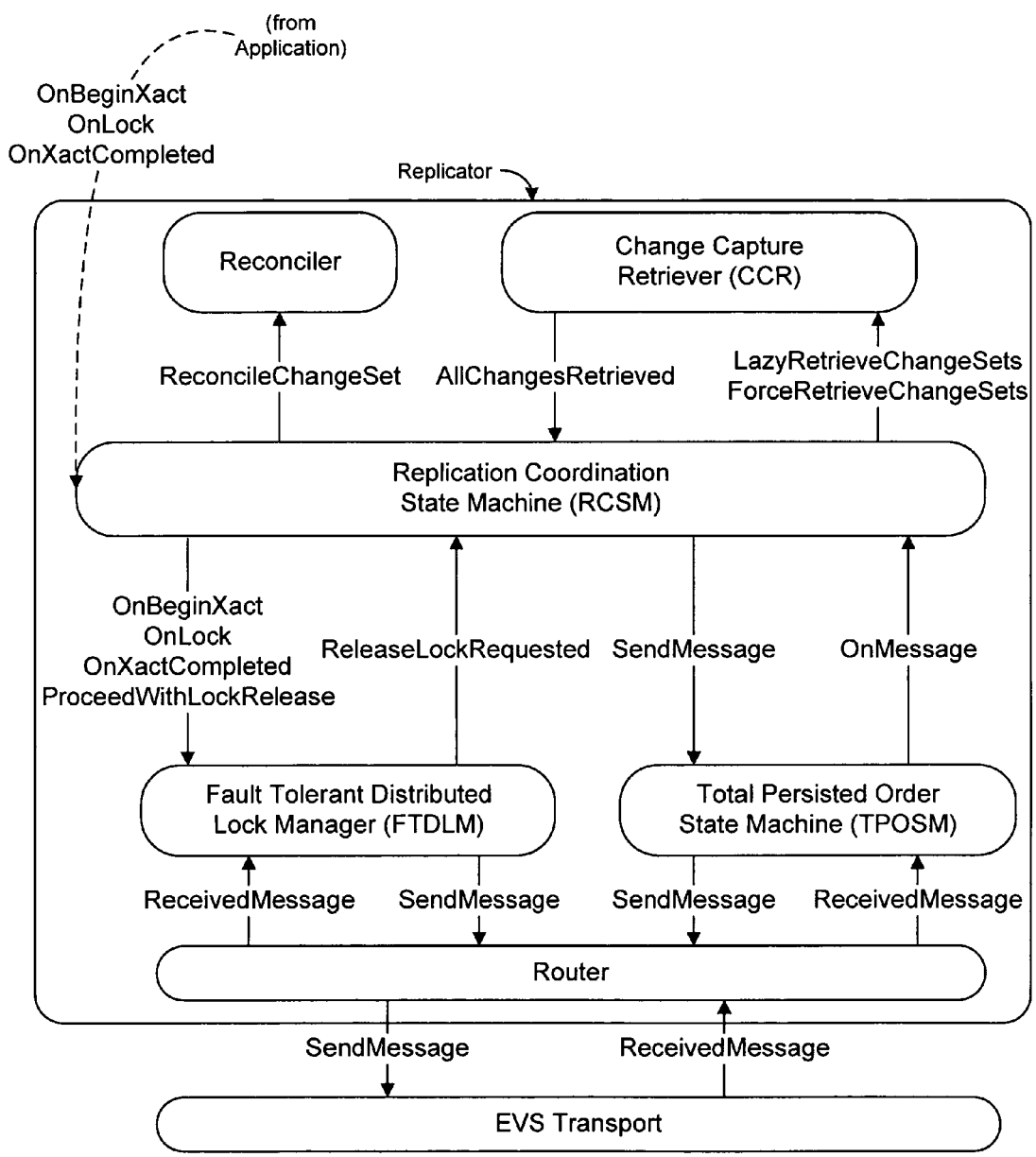
FIG. 2b is a block diagram illustrating data flow between components of the replicator module shown in FIG. 2a, in accordance with an embodiment of the present invention.

FIG. 2b is a block diagram illustrating data flow between components of the replicator module shown in FIG. 2a, in accordance with an embodiment of the present invention. This diagram depicts the events that the various modules use to interact with each other to implement replicator functionality.

The reconciler module is essentially more of an adaptor than a state machine. This module functions to abstract the database implementation, data schema, data format, and query language specific aspects of reconciliation away from the RCSM. The reconciler module input event is ReconcileChangeSet. The RCSM passes a change set to the Reconciler via this event. The reconciler module outputs database specific update language.

The CCR module is responsible for obtaining changes stored in the local database and presenting them to the RCSM. The method of extraction is dependent on the database system, as will be apparent in light of this disclosure. A change capture mechanism ensures that changes were previously captured during the execution of the transaction and made available to the CCR. In this particular embodiment, there are two inputs to the CCR module: LazyRetrieveChangeSets and ForceRetrieveChangeSets. The RCSM calls the LazyRetrieveChangeSets function when the RCSM realizes that a transaction has committed (thereby implying that there are change sets to be retrieved) and there are no waiters for the distributed locks made available by the commit of this transaction. This allows the change set to be asynchronously retrieved, significantly improving throughput at the cost of latency. A monotonically increasing unique identifier is associated with each request for change set retrieval. This identifier is used later in the AllChangesRetrieved event to identify which request has been sent. The RCSM calls the ForceRetrieveChangeSets function when the RCSM realizes that a transaction has committed (thereby implying that there are change sets to be retrieved) and there are waiters for the distributed locks freed by the commit of this transaction. Before the locks can be released, all changes are first sent to the TPOSM. To minimize latency, the CCR module ensures that the retrieval is done as soon as possible, in this particular embodiment. The output of the CCR module in this embodiment is AllChangesRetrieved. After each Retrieve* request, there is at least one retrieval from the database. After the retrieval is done, the CCR module uses the AllChangesRetrieved event to signal the RCSM which Retrieve* request has been serviced and the change set that was retrieved. Note that change set retrieval is a significant performance cost. However, a performance optimization can be implemented. In particular, observe that a single change set retrieval to the database is sufficient to service not just the last Retrieve received by the CCR module before the retrieval, but all Retrieve requests received by the CCR module that precede the retrieval. Thus, a single retrieval by the CCR module can result in the servicing of many Retrieve requests and may result in many corresponding AllChangesRetrieved events back to the RCSM. The CCR module maintains the invariant that there is at least one retrieval between the time the Retrieve* was called by the RCSM and the AllChangesRetrieved event is received by the RCSM.

The total persisted order state machine (TPOSM) in the replicator module is based on the method described in the previously incorporated "From Total Order to Database Replication" by Amir and Tutu, in accordance with one embodiment of the present invention. However, the algorithm described there is augmented and enhanced for the purposes of implementing the replication methods described herein. Also, various other aspects of the TPOSM were not well specified in the Amir and Tutu paper. These aspects are described herein. Prior to discussing modifications to the original TPOSM, some of the original TPOSM is first defined (as described by Amir and Tutu). The original TPOSM consisted of seven states: NonPrimary, Regular Primary, Transitional Primary, Exchange States, Exchange Actions, Construct, Undecided and No. Changes are communicated over a network between members as actions, which are uniquely identified by a monotonically increasing per member index starting at 0 and the member unique identifier. The original TPOSM specified two sets of persistent actions: those in a local ongoing queue which have not been sent yet, and those in the action list which contains the total persisted order across all of the members. The original TPOSM defines three categories of actions: red, yellow, and green. Red actions are actions whose total persisted order is not known, yellow actions are those whose order is known but not confirmed, and green actions are those whose order is known and confirmed.

In one embodiment of the present invention, the TPOSM defines a per action member relative total persisted order value. This value is unset until an action has been marked green at the local member, at which time it is assigned the next value of the total persisted order. Because the set of members of the coordination group can change with time, the total persisted order value on each action is relative to the local member. This value is primarily used in the RCSM for reconciliation purposes. This is a significant departure from the original TPOSM, as the replication method of this particular embodiment does not execute all updates in the total order.

In the original TPOSM, new changes from the replica are placed as uncolored actions in the ongoing queue and then communicated to other members during Regular Primary and NonPrimary. Because changes in the local replica are applied prior to being replicated across the coordination group, care must be taken when sending actions. When the changes are received by this member they are removed from the ongoing queue. In the original TPOSM, upon installation of primary any actions in the ongoing queue are sent, and upon recovery any actions in the ongoing queue are marked red. The replicator module configured in accordance with an embodiment of the present invention takes a different approach. In this particular embodiment, rather than maintaining an ongoing queue, local actions are marked red immediately. This leads to increased performance during recovery as well as a more deterministic total order as such actions are marked green across all members upon installation of primary, rather than in batches at beginning of primary. There is also a performance improvement in maintaining a single list of actions, because less action copying is needed.

In the original TPOSM the notion of a most up to date member was introduced but not defined. Such member is responsible for retransmitting the action list of green actions in the totally persisted order during the Exchange Actions state. Because in an arbitrary set of members each member may have different amounts of historical data, the algorithm for determining the most up to date member relies on the unique action identifiers rather than any member relative index. The replicator module configured in accordance with an embodiment of the present invention uses the following algorithm to determine the most up to date member. For each member of the coordination group, find the highest action marked green across all the members in the configuration. Then for each member of the coordination group, form a set of members of the configuration that have marked the highest action green. Then intersect those sets, and take the member with the maximal unique member ID.

In the original TPOSM, a retransmission protocol was not well defined. The most up to date member retransmitted the green actions but it is unclear what the other members are to retransmit. The replicator module configured in accordance with an embodiment of the present invention specifies the protocol as the most up to date member retransmits green actions then red actions, and the other members retransmit red actions in unique identifier order. Additionally, because the communication system is not considered an infinite sink and has limited resources, the replicator module of this particular embodiment specifies a flow control system based on the durable memory size of the actions that have been sent. This has two effects: first it prevents the communication system from being overwhelmed, and secondly it prevents remote out of date members from appearing to crash during recovery. Remote data members can appear to crash when the population of green actions in their action lists and the application of those actions to their local replicas is time consuming. In this case, the communication system can erroneously conclude that those members have crashed, and evict them from the configuration thereby producing a configuration change. Because a configuration change involves restarting a recovery process or state machine, configuration changes are expensive, and avoiding them improves overall recovery performance.

The original TPOSM removes historical messages that are not needed because all members have them. The replicator module configured in accordance with an embodiment of the present invention implements this removal as a process that runs when the action list reaches a multiple of a configurable value, called the white line limit. Each member can determine the last action marked green on other members through the green line information in each action. If a member in the current configuration does not send any actions during long running primaries such a member can inhibit the removal of historical messages because other members won't know the last message that such a member has marked green. Therefore, the replicator module of this particular embodiment is programmed or otherwise configured to send a status action at a frequency of half of the white line limit if the local member has not sent any messages. This allows members to continue to remove historical information, thereby preventing the durable storage associated with the replicator module to grow without bound. In one such embodiment, the replicator module uses the following algorithm to determine how much historical data may be removed because it is no longer needed: For each member of the coordination group, determine the last action it has marked green, and call this the least set. Find the action in the least set with the lowest total order value in the local action list. The last unneeded historical action is the action just prior to that least action with the lowest total order value in the local action list. All actions in the local action list prior to the last unneeded action may be discarded.

The TPOSM receives SendMessage as an input. SendMessage is used by the RCSM to send a change set to deliver to all other RCSM instances in the coordination group. The message is delivered guaranteeing total persisted order. The call is made in the context of a transaction and is made in the same transaction as the change retrieval executed by the CCR module. The TPOSM outputs OnMessage, which is used to notify the RCSM that a total persisted order message is ready (marked green) to be reconciled. The message is delivered in the context of a transaction and provides both the message itself and a unique sequence number.

The fault tolerant distributed lock manager (FTDLM) enables fault tolerant replication, as will be appreciated in light of this disclosure. In one embodiment, the FTDLM is generally implemented as described in the previously incorporated U.S. application Ser. No. 11/270,196, except that the output is augmented with a notification LockTransferRequired and an input with ReleaseLockGranted. These additions to the FTDLM can be used to implement part three of the previously described Commit Rule, which states that the lock release message is sent after the associated changes are sent via the TPOSM.

In such an embodiment, the RCSM notifies the FTDLM when a commit has occurred and locks can be released via the OnXactCompleted event. The FTDLM is modified to provide an event to the RCSM to notify when a distributed lock transfer is required (e.g., ReleaseLockRequested). In particular, the FTDLM is modified by changing the logic in the lock queue state machine, as will be discussed with reference to FIGS. 3a and 3b. The RCSM will notify the CCR module to retrieve the changes and send them. Then the RCSM will notify the FTDLM that it can now proceed with transferring the lock ownership (e.g., Proceed WithLockRelease).

Figure 3A:
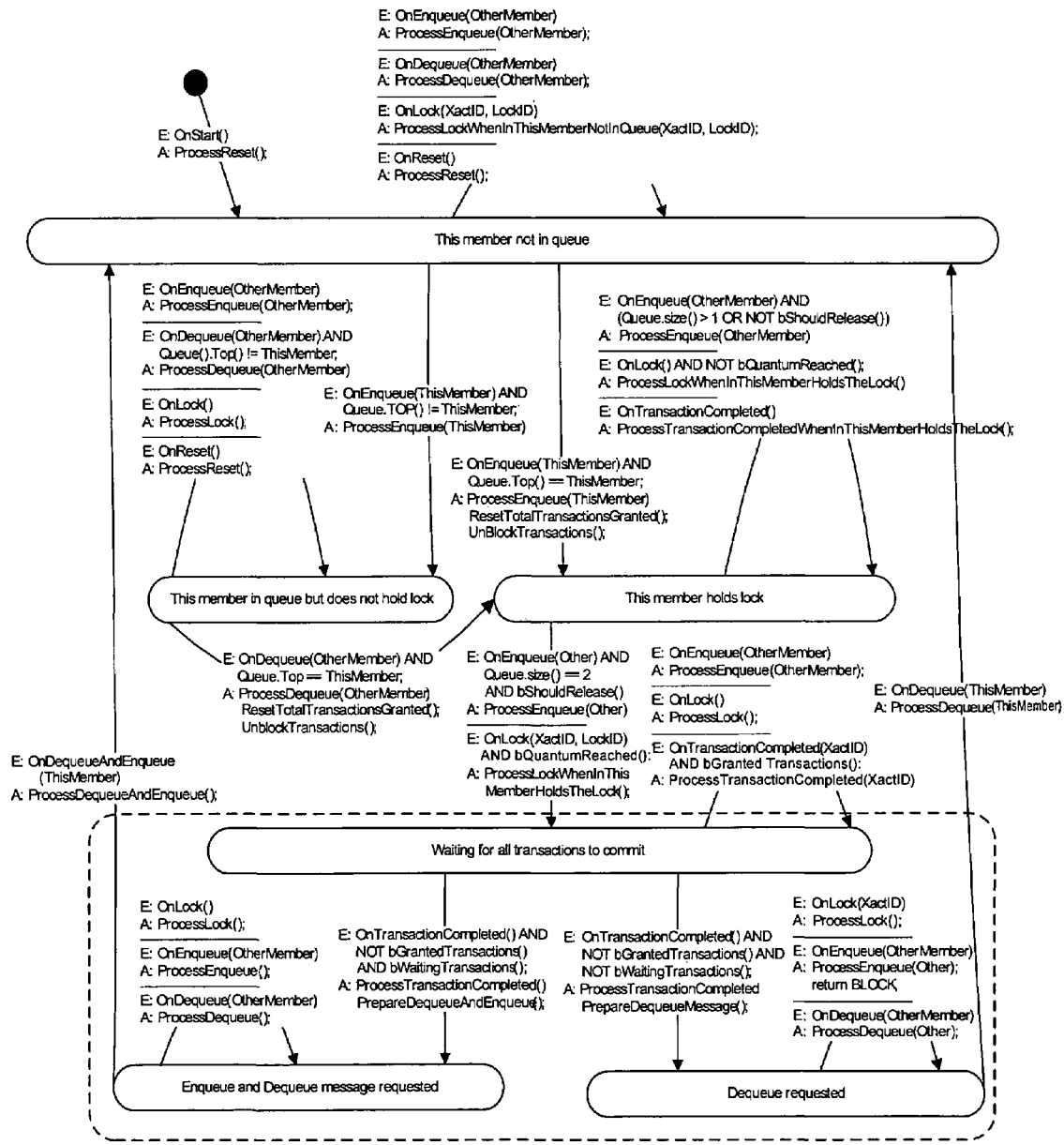
FIGS. 3a and 3b illustrate a lock queue state machine of the fault tolerant distributed lock manager module shown in FIGS. 2a and 2b, configured in accordance with an embodiment of the present invention.
Figure 3B:
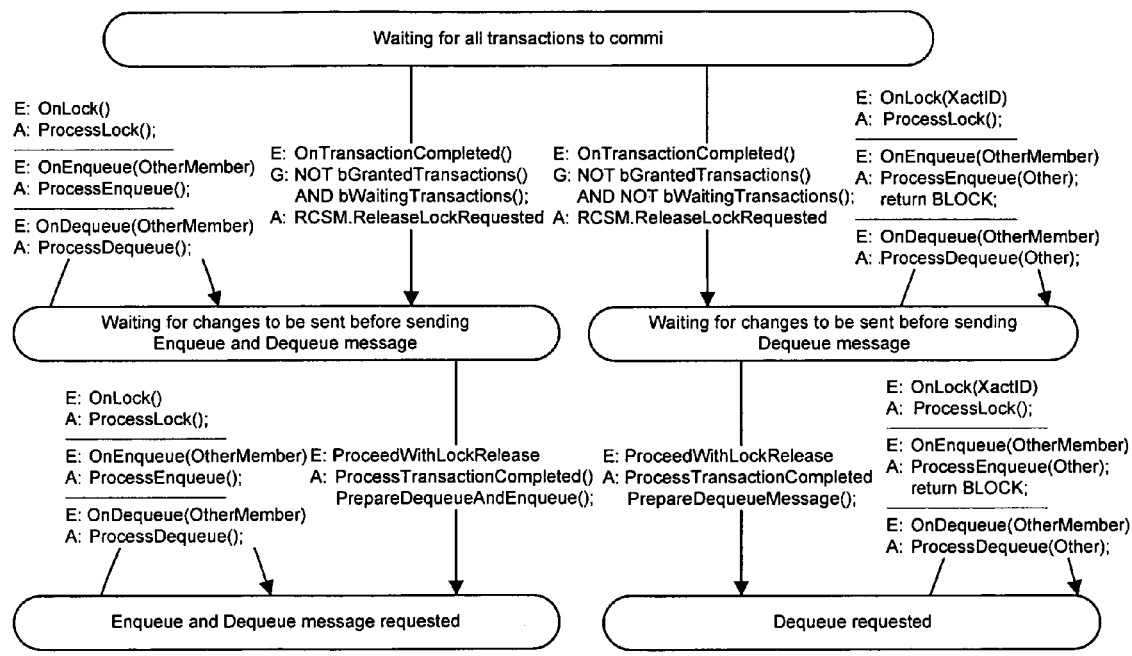

Modification to the lock queue state machine of the FTDLM can be better understood with reference to FIGS. 3a and 3b. In particular, FIG. 3a illustrates an embodiment of the original lock queue state machine as described in U.S. application Ser. No. 11/270,196. The portion of that state machine that is modified is indicated in FIG. 3a by a dashed-line box. FIG. 3b illustrates that portion with the modifications used to implement logic for the replicator module, in accordance with an embodiment of the present invention. In more detail, FIG. 3b depicts the necessary modifications needed to ensure that the FTDLM does not send the dequeue or enqueue message before allowing the RCSM to send the captured changes.

Inputs of the FTDLM of the embodiment shown in FIG. 2b are as follows. The RCSM uses the OnBeginXact event to notify the FTDLM to prepare for the acquisition of a set of locks. The RCSM uses the OnLock event to notify the FTDLM to acquire a lock on a resource. The resource ID is included in the event. The RCSM uses the OnXactCompleted event to notify the RCSM that the current transaction is completed. The RCSM uses the ProceedWithLockRelease event to notify the FTDLM that it is okay to proceed with lock release on a resource. The output of the FTDLM includes RelaseLockRequested. This event is used to inform the RCSM that the FTDLM needs to release a lock, allowing the RCSM to arrange to first send all changes before the FTDLM sends a lock release message.

Figure 4:
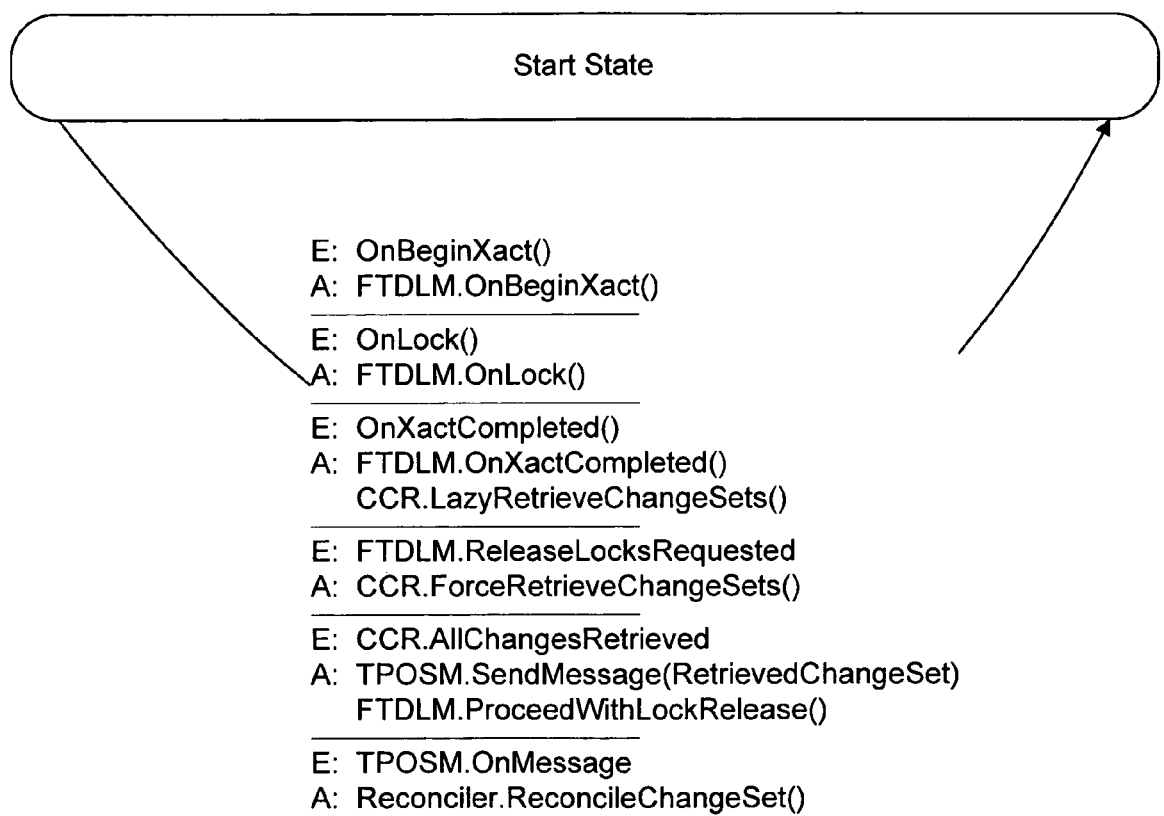
FIG. 4 illustrates a replication coordination state machine shown in FIGS. 2a and 2b, configured in accordance with an embodiment of the present invention.

FIG. 4 illustrates an example embodiment of the RCSM, configured in accordance with an embodiment of the present invention. As previously explained, the RCSM is responsible for coordinating the FTDLM, CCR module, TPOSM, and reconciler module. There are two major types of coordination: inbound and outbound. Inbound coordination involves the reception of actions from the TPOSM and outbound coordination involves the sending of newly generated actions to the TPOSM. With reference to FIG. 4 (as well as FIGS. 3a and 3b), note that ovals represent states of the state machine. Each arrow has an event and an action labeled with "E:" or "A:" respectively. Events trigger the transition as well as the action in the arrow. Events that are not explicitly depicted in the diagram of this example embodiment are either not possible or are ignored (e.g., neither causes state transitions to occur nor executes any actions). Also, conditional statements limiting when the corresponding event can be carried out are indicated with (G:). Note that sometimes such conditional statements can be placed in the corresponding event lines (E:) of the state machine as well (rather than in a separate guard line).

A number of refinements of the RCSM logic can be implemented, such as dual-storage support. In more detail, the interaction between the RCSM and the TPOSM of the example embodiment shown in FIGS. 2a and 2b is dependent on whether the durable storage for the TPOSM is the same as for the replicated database. When different durable storage systems are used for the TPOSM and the replicated database, this is called a heterogeneous configuration. Conversely, a homogenous configuration indicates the same durable storage system is used for both.

For inbound coordination, the RCSM is programmed or otherwise configured to ensure that the reconciler module and the local database replica are kept up to date with the TPOSM. When the TPOSM delivers an action to the RCSM, the RCSM determines if that action should be locally applied, and whether it is the next action to be locally applied. Locally generated actions and actions such as status actions are not applied to the local replica. The RCSM durably stores the total persisted order value of the last action given to it by the TPOSM in a value called the reconciliation point. During normal operation, the reconciliation point will contain the value of the last green action in the TPOSM action list. In accordance with this particular embodiment, at no time is the reconciliation point allowed to exceed the total persisted order value of the last green action in the TPOSM action list. If this is the case, then the TPOSM has been corrupted and no further processing occurs. However, it is acceptable for the reconciliation point to be less than the total persisted order value of the last green action in the TPOSM action list. When the TPOSM gives the RCSM a new action, the RCSM compares the total persisted order value in the action to the reconciliation point. If the new total persisted order value is not one greater than the reconciliation point, then the RCSM requires the TPOSM to give it the intervening actions such that it can bring the local replica up to date. When the action should not be applied to the local replica, the RCSM only updates the reconciliation point. In homogenous configurations, the reconciliation of an action and the marking of the action green can be combined into a single transaction. In heterogeneous configurations they are separated into two separate transactions. In any case, the algorithm described herein applies.

For outbound coordination, the RCSM of this embodiment is responsible for routing requests and callbacks between the CCR module and the FTDLM. As noted in the previously incorporated U.S. application Ser. No. 11/270,196 (which describing an embodiment of the FTDLM), prior to sending messages to dequeue locks any associated changes are sent as well. Upon receipt of a request to send such changes, the RCSM notifies the CCR module to obtain changes from the replicated database. The RCSM sends these resulting changes to the TPOSM, which persists them in the TPOSM durable storage (or other suitable storage facility), marks them red, and sends them. Then the RCSM notifies the FTDLM that the changes have been sent.

In homogenous configurations, the CCR module transaction to extract changes from the replicated database and the TPOSM transaction to persist such changes and mark them red can be combined into a single transaction. In heterogeneous configurations they occur in separate transactions.

Note that process crashes between the transaction to extract changes and the transaction to persist the resulting action should be treated carefully. However, in accordance with an embodiment of the present invention, changes are extracted in single batches and then persisted as actions. Therefore, no more than one set of changes from the CCR module can be obtained at a time. Because the transformation from changes to action is deterministic, the transaction in the TPOSM can be omitted (the action will be persisted anyways upon receipt). Omitting this transaction increases the outbound performance for heterogeneous configurations to that of homogenous configurations.

The relative performance of heterogeneous and homogenous configurations can be determined by considering the use of durable storage systems with the same general transaction rate. In this case, without the omission of outbound transactions in the TPOSM, the heterogeneous case is about one-half as fast as the homogenous case. With the omission of outbound transactions in the TPOSM the heterogeneous case is about two-thirds as fast as the homogenous case.

As with the FTDLM, the RCSM has some minimal knowledge of the current TPOSM state. In particular, the RCSM is responsible for retrieving changes made to the local database replica and presenting them to the TPOSM. In accordance with one embodiment of the present invention, the TPOSM does not contain a buffer for client requests as in the original TPOSM described by Amir and Tutu. Instead, the TPOSM inhibits retrieval of changes from the local replica. Because changes are durably stored in the local replica, inhibiting retrieval effectively implements a buffer without the transactional overhead. Additionally, this allows the TPOSM to group sets of changes together into a single action, thereby improving performance as fewer transactions are needed to replicate the same set of changes.

Thus, FIG. 2a illustrates an example design of the replicator module by depicting replicator components and their relationships. FIG. 2b further details the replicator module by illustrating the contracts between the components, with a data flow diagram. As data flow diagrams do not show the flow of control, a sequence diagram will now be discussed, to show typical control flows in the replicator module, with reference to FIG. 5.

Replicator Control Flow

Figure 5:
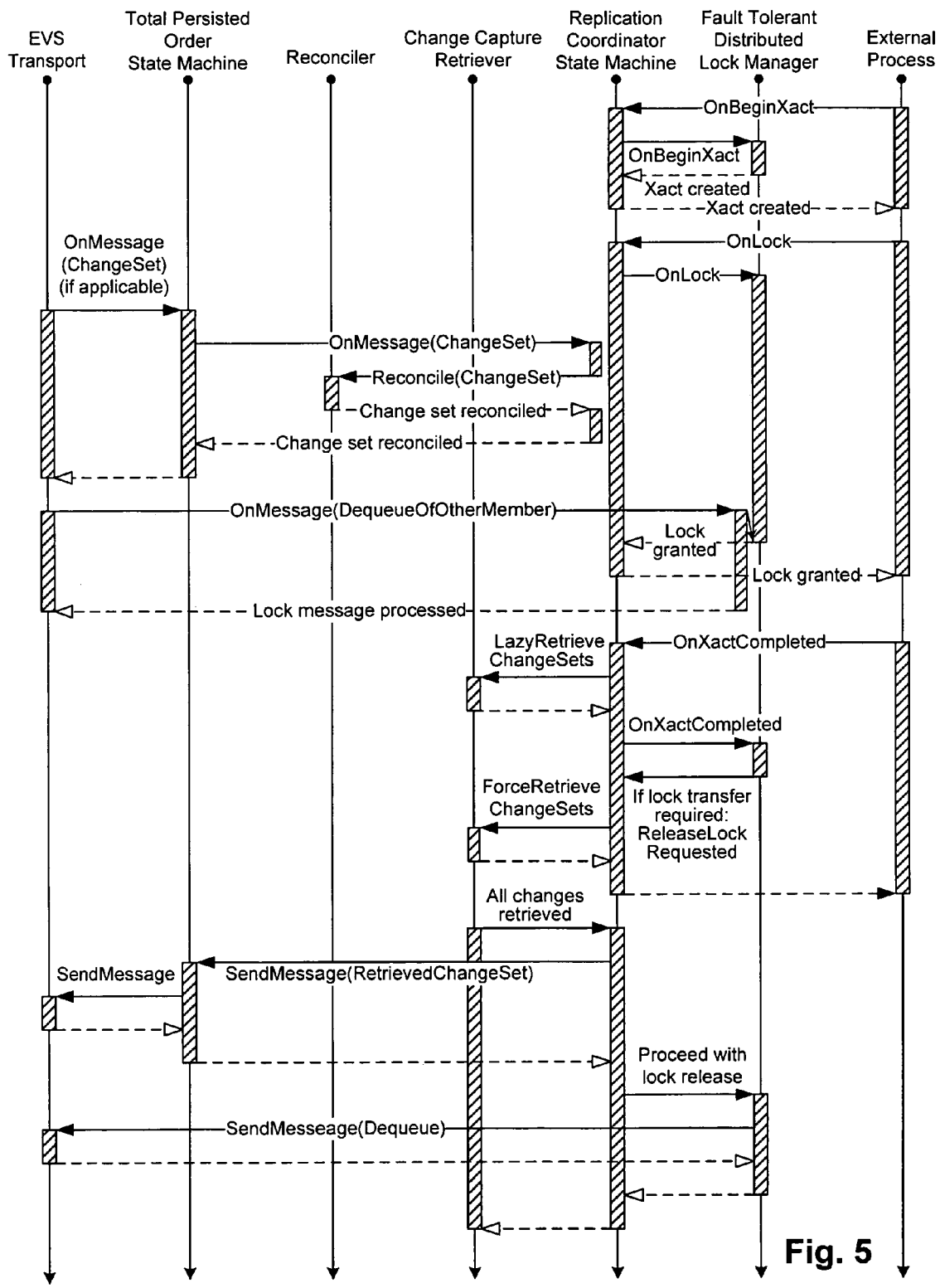
FIG. 5 is a replicator sequence diagram for the replicator module shown in FIGS. 2a and 2b, in accordance with an embodiment of the present invention.

FIG. 5 is a replicator sequence diagram that illustrates control flows across components of the replicator module shown in FIGS. 2a and 2b, in accordance with an embodiment of the present invention. The function names depicted in this diagram are referred to and defined herein, with previous relevant discussions equally applicable here. The direction of the arrows indicates the direction of data flow, not the flow of control. Further note that unified modeling language (UML) diagramming syntax is adopted, whereby time flows from high to low, shaded boxes represent focus of control, solid lines represent events and event flow, and dashed lines represent replies. Multiple threads of control executing concurrently within a component are depicted via parallel shaded boxes.

The diagram first depicts the flow of events occurring after an external process provides the replication coordination state machine (RCSM) with the OnBeginXact ("On Begin Transaction") event. The RCSM forwards this OnBeginXact event to the fault tolerant distributed lock manager (FTDLM).

The FTDLM creates the data structures associated with tracking transactions and returns control back to the RCSM. The RCSM returns control back to the external process.

The sequence of events beginning with the external process sending the RCSM the OnLock event implements the Write Rule as previously discussed. The external process notifies the RCSM of the OnLock event. The RCSM forwards this notification to the FTDLM. If this member is currently at the top of the queue associated with the locked resource (as described in the previously incorporated U.S. application Ser. No. 11/270,196), then the FTDLM returns control after updating the appropriate transaction data structures. If this member is not at the top of the queue, the FTDLM logic broadcasts an enqueue message to all other members. The FTDLM then waits until this member rises to the top of the queue. During the time of this wait, other members in the coordination group may make updates. For instance, let this member be A and another member B. Member B may currently own the lock and be updating data. After committing the data, the replicator module at B first sends the ChangeSet. This is illustrated in the sequence of events beginning with the extended virtual synchrony (EVS) transport sending an OnMessage(ChangeSet) to the total persisted order state machine (TPOSM). This sequence illustrates the Reconciliation Rule. The TPOSM, after marking green the message, notifies the RCSM (within a transaction context) of the arrival of a message (also depicted as OnMessage(ChangeSet)). The RCSM gives this change set to the reconciler module (Reconcile(ChangeSet)). The reconciler module applies this change set to the application data and returns (Change set reconciled). The RCSM returns (also depicted as Change set reconciled). The TPOSM commits the transaction and returns to the EVS transport. This completes the executing of a sequence of actions that reconciles received change sets. The FTDLM at member B, at this point, broadcasts a dequeue message because it sees that member A requires this lock (since member B is enqueued in the replicated queue). Assume that after member B is dequeued that member A is at the top of this queue. This is illustrated by the sequence of events beginning with the EVS transport sending the FTDLM an OnMessage(DequeueOfOtherMember) event. The FTDLM, on receiving the dequeue message, removes member B from its local copy of the queue. The FTDLM sees that member A (this member) is now at the top of the queue. The FTDLM also sees that there is a thread waiting for access to this lock and uses local inter-thread communication to notify the other thread that the lock is now granted. That other thread returns to the RCSM (Lock granted), and the RCSM returns control (also depicted as Lock granted) to the external process. Meanwhile, this thread, returns control from the FTDLM component back to the EVS transport (Lock message processed). This completes the processing of the receipt of this dequeue message.

The sequence of events beginning with the external process sending the RCSM the OnXactCompleted event implements the Commit Rule as previously discussed. The external process notifies the RCSM that a transaction has committed (or aborted) via the OnXactCompleted event. The RCSM then notifies the CCR module that change sets are available to be retrieved via the LazyRetrieveChangeSets. This guarantees that the CCR module will retrieve the change sets and inform the RCSM, but that it can take its time to do so to minimize computational load via batching. The CCR module returns control to the RCSM immediately. The RCSM then notifies that FTDLM via the OnXactCompleted event. The FTDLM logic updates its transaction data structures appropriately and determines if it is necessary to release the distributed lock because another member has enqueued a request for the lock. If no, the FTDLM simply returns. If yes, the FTDLM notifies the RCSM via the ReleaseLockRequested event that it needs to release a distributed lock as quickly as possible. The RCSM then sends the CCR module a ForceRetrieveChangeSets event. In one embodiment, the CCR module, on receiving this event, retrieves the changes as quickly as possible to minimize latency (as opposed to trying to batch retrievals together to minimize computation costs). The CCR module returns, the RCSM returns, and the external process regains control. As soon as the CCR module completes the retrieval of the change set, it provides these changes to the RCSM via the AllChangesRetrieved event. The RCSM forwards this change set to the TPOSM via the SendMessage(RetrievedChangeSet) event. The TPOSM sends this message via the EVS transport (SendMessage). The EVS transport then returns control to the TPOSM. The TPOSM then returns control to the RCSM. The RCSM, knowing that all change sets have been sent, then notifies the FTDLM of the ProceedWithLockRelease event. The FTDLM logic, on receiving this event, now calls the EVS transport with SendMessage(DequeueOfThisMember) to release the distributed lock. The EVS transport returns control to the FTDLM, the FTDLM returns control to the RCSM, and the RCSM returns control to the CCR module.

As will be appreciated in light of this disclosure, the replicator module can be implemented (e.g., using state machines or other components as described herein) to execute this sequence of events and actions. Software, hardware, firmware, or any combination thereof can be used to implement the replicator module functionality.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A replicator for replicating data among a plurality of processing sites each communicatively coupled to a network, the replicator comprising:

a fault tolerant distributed lock manager (FTDLM) for acquiring one or more distributed exclusive locks associated with a write transaction, the write transaction comprising a set of data changes; and a total persisted order state machine (TPOSM) for creating and sending a change set to the plurality of processing sites, the change set comprising the data changes retrieved after the write transaction is committed and preserving change ordering in a total persisted order;

wherein the one or more distributed exclusive locks release after the change set is sent to the plurality of processing sites; and wherein the plurality of processing sites reconcile the change set with a received change set and a received lock management message for changing ownership of the one or more distributed exclusive locks, so that the change sets are applied and locks are released in the total persisted order.

2. The replicator of claim 1 further comprising:

a replication coordination state machine (RCSM) for coordinating operation of replicator components including the TPOSM and the FTDLM to implement read, write, commit, and reconciliation rules.

3. The replicator of claim 1 further comprising:
a reconciler module for receiving data changes, and updating data in a storage with those data changes.

4. The replicator of claim 1 further comprising:
a change capture retriever (CCR) module for retrieving committed data changes from a storage so that those data changes can be sent by the TPOSM.

5. The replicator of claim 1 further comprising:
a router for multiplexing outputs from the FTDLM and the TPOSM into an extended virtual synchrony (EVS) transport.

6. A method for replicating data among a plurality of processing sites each communicatively coupled to a network, the method comprising:
acquiring one or more distributed exclusive locks associated with a write transaction, the write transaction comprising a set of data changes;
creating a change set that comprises the data changes retrieved after the write transaction is committed and preserves change ordering in a total persisted order;
sending the change set to the plurality of processing sites;
releasing the one or more distributed exclusive locks after the change set is sent to the plurality of processing sites; and
reconciling the change set with a received change set and a received lock management message for changing ownership of the one or more distributed exclusive locks, so that the change sets are applied and locks are released in the total persisted order.

7. The method of claim 6 further comprising:
coordinating operation of replication components to implement read, write, commit, and reconciliation rules.

8. The method of claim 6 further comprising:
receiving data changes; and
updating data in a storage with those data changes.

9. The method of claim 6 further comprising:
retrieving committed changes from a storage so that those data changes can be sent to the plurality of processing sites.

10. The method of claim 6 further comprising:
multiplexing outputs into an extended virtual synchrony (EVS) transport.

11. The method of claim 6 further comprising:
acquiring a distributed share lock associated with a read transaction; and
acquiring a local read lock associated with the read transaction.

12. The method of claim 6 further comprising:
acquiring a local write lock associated with the write transaction.

13. The method of claim 6 further comprising:
capturing the data changes in a database change log.

14. The method of claim 13 wherein the method further comprises:
retrieving the data changes associated with the write transaction from the database change log to form the change set that preserves change ordering; and
assigning an identifier to the change set, the identifier specifying a site that initiated the commit.

15. The method of claim 6 further comprising:
passing the change set to a total persisted order state machine (TPOSM), the TPOSM using an extended virtual synchrony (EVS) broadcast primitive.

16. The method of claim 11 wherein after the change set is sent to the plurality of processing sites, the distributed share lock and the one or more distributed exclusive locks associated with the transaction are released.

17. The method of claim 6 wherein sending the change set and identifier to the plurality of processing sites is achieved using a total order broadcast primitive.

18. The method of claim 6 wherein in response to the plurality of processing sites requesting the distributed lock, the method further comprises:
broadcasting messages to the plurality of processing sites using a total order broadcast primitive in order to transfer ownership of the distributed lock.

19. The method of claim 1 wherein the reconciling is achieved using an external process that receives the delivered messages from a total order broadcast primitive.

20. A machine-readable medium encoded with instructions, that when executed by a processor, cause the processor to carry out a process for replicating data among a plurality of processing sites each communicatively coupled to a network, the process comprising:
acquiring one or more distributed exclusive locks associated with a write transaction;
creating a change set that preserves change ordering in a total persisted order containing the data changes associated with the write transaction retrieved after the write transaction is committed;
sending the change set to the plurality of processing sites;
releasing the one or more distributed exclusive locks after the change set is sent to the plurality of processing sites; and
reconciling the change set with a received change set and a received lock management message for changing ownership of the one or more distributed exclusive locks, so that the change sets are applied and locks are released in the total persisted order.

21. The machine-readable medium of claim 20, the process further comprising:
coordinating operation of replication components to implement read, write, commit, and reconciliation rules.

22. The machine-readable medium of claim 20, the process further comprising:
receiving data changes; and
updating data in a storage with those data changes.

23. The machine-readable medium of claim 20, the process further comprising:
retrieving committed changes from a storage so that those data changes can be sent to the plurality of processing sites.

24. The machine-readable medium of claim 20, the process further comprising:
multiplexing outputs into an extended virtual synchrony (EVS) transport.

25. The machine-readable medium of claim 20, the process further comprising:
acquiring a distributed share lock associated with a read transaction; and
acquiring a local read lock associated with the read transaction.

26. The machine-readable medium of claim 20, the process further comprising:
acquiring a local write lock associated with the write transaction.

27. The machine-readable medium of claim 20, the process further comprising:
capturing the data changes in a database change log.

28. The machine-readable medium of claim 27 wherein after successfully committing the data changes, the process further comprises:

retrieving the data changes associated with the write transaction from the database change log to form a change set that preserves change ordering; and assigning an identifier to the change set, the identifier specifying a site that initiated the commit.

29. The machine-readable medium of claim 20, the process further comprising:

passing the change set to a total persisted order state machine (TPOSM), the TPOSM using an extended virtual synchrony (EVS) broadcast primitive.

30. The machine-readable medium of claim 25 wherein after the change set is sent to the plurality of processing sites, all distributed share locks and distributed exclusive locks associated with the transaction are released.

31. The machine-readable medium of claim 20 wherein sending the change set to the plurality of processing sites is achieved using a total order broadcast primitive.

32. The machine-readable medium of claim 20 wherein in response to the plurality of processing sites requesting the distributed lock, the process further comprises:

broadcasting messages to the plurality of processing sites using a total order broadcast primitive in order to transfer ownership of the distributed lock.

33. The machine-readable medium of claim 20 wherein the reconciling is achieved using an external process that receives the delivered messages from a total order broadcast primitive.

34. The machine-readable medium of claim 20, the process further comprising the preliminary steps of:

requesting one or more distributed exclusive locks associated with the write transaction for locally stored data;

receiving data changes caused by another write transaction performed at another processing site on a replica of the locally stored data, the received data changes indicating differences between the locally stored data and the replica; and guaranteeing that all the received data changes are applied to the locally stored data before any of the distributed exclusive locks associated with the write transaction are granted.

* * * * *